United States Patent
Havlin et al.

(10) Patent No.: US 10,140,278 B2
(45) Date of Patent: Nov. 27, 2018

(54) COMPUTER-IMPLEMENTED METHODS AND SYSTEMS FOR ASSOCIATING FILES WITH CELLS OF A COLLABORATIVE SPREADSHEET

(75) Inventors: Brian Havlin, San Jose, CA (US); Randall Silvia, Alpine, CA (US); Eylon Stroh, San Carlos, CA (US); Roman Dolgov, San Carlos, CA (US); Shannon Hickey, Ontario (CN); Peter Baird, Arlington, MA (US); Todd Rein, San Francisco, CA (US); Randy Swineford, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 254 days.

(21) Appl. No.: 13/430,178

(22) Filed: Mar. 26, 2012

(65) Prior Publication Data
US 2013/0254157 A1 Sep. 26, 2013

(51) Int. Cl.
*G06F 17/24* (2006.01)
*G06Q 10/10* (2012.01)

(52) U.S. Cl.
CPC ........... *G06F 17/246* (2013.01); *G06Q 10/10* (2013.01)

(58) Field of Classification Search
CPC .. G06F 17/246; G06F 17/212; G06F 11/1412; G06F 17/30194; H04L 65/60; H04L 67/10; H04L 67/1002
USPC .............................. 707/608, 821; 1/608, 821
See application file for complete search history.

(56) References Cited

U.S. PATENT DOCUMENTS

| | | | |
|---|---|---|---|
| 6,389,434 B1 * | 5/2002 | Rivette | G06F 17/30014 707/E17.008 |
| 2007/0162840 A1 * | 7/2007 | Rochelle | G06F 17/2247 715/210 |
| 2008/0163122 A1 * | 7/2008 | Wolf | 715/847 |
| 2011/0055681 A1 * | 3/2011 | Smialek et al. | 715/219 |
| 2011/0231386 A1 * | 9/2011 | Wang | G06F 17/30864 707/709 |
| 2011/0289161 A1 * | 11/2011 | Rankin et al. | 709/206 |
| 2012/0066574 A1 * | 3/2012 | Lee et al. | 715/202 |
| 2012/0143958 A1 * | 6/2012 | Augustine | 709/205 |
| 2012/0192050 A1 * | 7/2012 | Campbell et al. | 715/212 |
| 2012/0279409 A1 * | 11/2012 | Aylward | B41J 3/01 101/483 |

(Continued)

OTHER PUBLICATIONS

Shetty—U.S. Appl. No. 13/708,040.*

*Primary Examiner* — Syling Yen
*Assistant Examiner* — Soheila (Gina) Davanlou
(74) *Attorney, Agent, or Firm* — Kilpatrick Townsend & Stockton LLP (57) ABSTRACT

One exemplary embodiment involves a computer-implemented method comprising receiving, in a computing device, a first request to attach a file in a cell of a collaborative spreadsheet, wherein the first request comprises the file and a cell identifier, and wherein the collaborative spreadsheet comprises a spreadsheet configured to be accessed and modified simultaneously from a plurality of client devices. The method additionally comprises attaching, via a processor, the file to the collaborative spreadsheet at the cell corresponding to the cell identifier; and storing the file on a cloud storage device, wherein the file is stored to be accessible in conjunction with the collaborative spreadsheet.

20 Claims, 4 Drawing Sheets

(56) References Cited

U.S. PATENT DOCUMENTS

2013/0133037 A1* 5/2013 Hwang ............... G06F 21/6218
726/4
2014/0149794 A1* 5/2014 Shetty et al. ................... 714/20

* cited by examiner

COMPUTER-IMPLEMENTED METHODS AND SYSTEMS FOR ASSOCIATING FILES WITH CELLS OF A COLLABORATIVE SPREADSHEET

FIELD

This disclosure relates generally to computer software and more particularly relates to the creation, modification, use, and distribution of electronic content.

BACKGROUND

Various technologies and computer products allow users to collaborate over networks to create and populate a spreadsheet from one or more client devices. Such a spreadsheet may include one or more workspaces accessible simultaneously by each of the users. The spreadsheet may be provided from a server device and/or other device with similar capabilities. In such contexts, users may access, edit and modify the spreadsheet to provide content. For example, users may add content to rows, columns, and/or individual cells of the spreadsheet. Additionally, users may reference other files within the collaborative spreadsheet through hyperlinks and URLs. However, existing techniques do not enable users to reference other files through file attachments to specific cells within a collaborative spreadsheet.

SUMMARY

One exemplary embodiment involves receiving a first request to attach a file to a cell of a collaborative spreadsheet. The collaborative spreadsheet is a spreadsheet configured to be accessed and modified simultaneously from one or more client devices. Additionally, the exemplary embodiment involves attaching the file to the requested cell of the collaborative spreadsheet. Further, the exemplary embodiment involves storing the file on a cloud storage device to be accessible in conjunction with the collaborative spreadsheet.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Methods and systems are disclosed that facilitate attachment of files to one or more cells of a collaborative spreadsheet. In certain exemplary embodiments, one or more users may collaborate to create and modify a spreadsheet by adding new content simultaneously over the network. For example, a spreadsheet module provides the collaborative spreadsheet to the users over the network and an attachment module enables the users to add new content to the collaborative spreadsheet by attaching one or more files to a cell of the collaborative spreadsheet. In one embodiment, the attachment module receives the file to be attached from the client and attaches the file to the cell. For instance, the attachment module modifies the collaborative spreadsheet by associating the file with the cell and configures the modified collaborative spreadsheet to include an icon representing the attached file that appears at the cell when the collaborative spreadsheet is rendered. Additionally, the attachment module stores the attached file in conjunction with the collaborative spreadsheet in memory and/or a storage device accessible to the attachment module.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
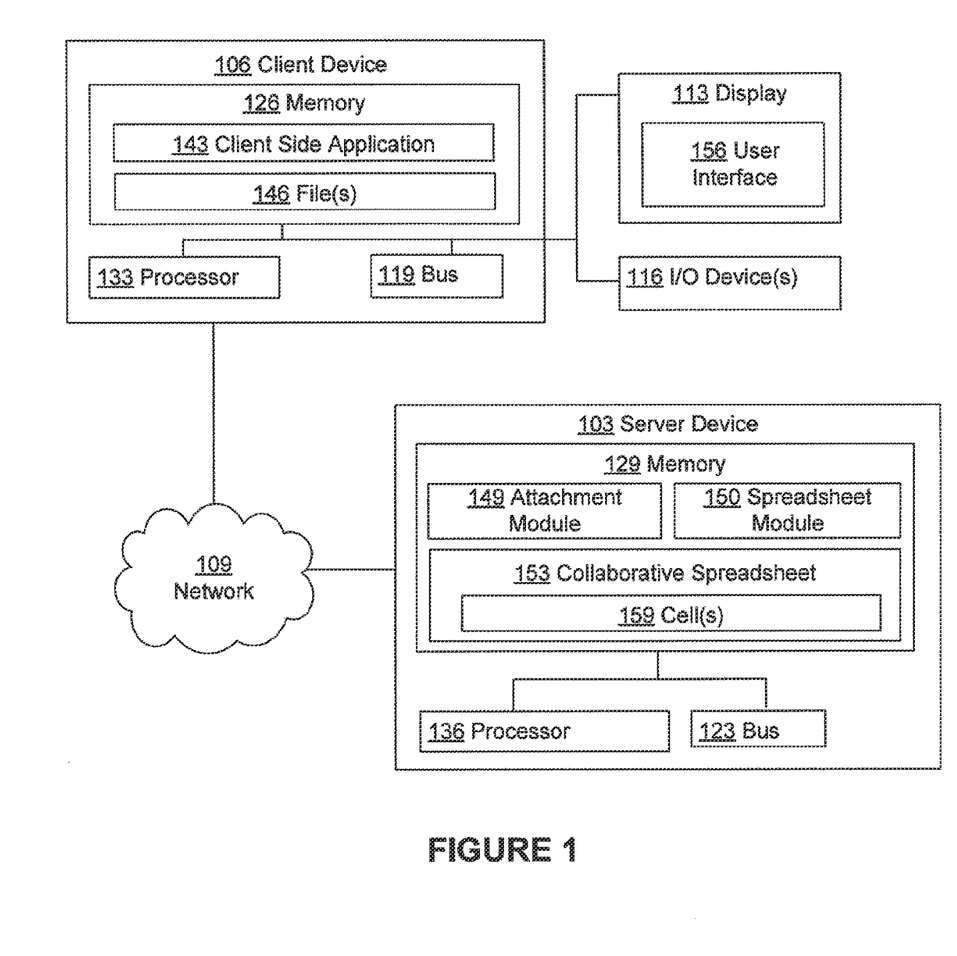
FIG. 1 is a block diagram depicting exemplary computing devices in an exemplary computing environment for implementing certain embodiments.

FIG. 1 depicts an exemplary computing environment for modifying collaborative spreadsheets by attaching files to cells of the collaborative spreadsheet and providing the modified spreadsheets. The methods and systems disclosed herein are also applicable on other computing systems and environments. The environment shown in FIG. 1 includes wired or wireless networks 109 connecting various devices 103 and 106. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 106 is shown with a display 113 and various input/output devices 116. A bus, such as bus 119 and bus 123, will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103 and 106 each have a computer-readable medium such as memory 126 and 129 coupled to a processor 133 and 136 that executes computer-executable program instructions and/or accesses stored information. Such processors 133 and 136 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Server device 103 is an example of a server. A "server device" may be used to facilitate attachment of a file to a cell of a collaborative spreadsheet stored by the server device. For example, the server device 103 may include an attachment module 149 that attaches a file 146 to a cell of a collaborative spreadsheet 153.

As used herein, the term "file" refers to electronic files that are maintained and organized by a file system. In certain embodiments, the files 146 organized by the file system may be abstractions that do not directly correspond to any particular physical storage arrangements such as disk drives, portable storage media, etc. Each file 146 may include a file name, a unique identifier, and a data object reference, and/or other data. In one embodiment, the file name may correspond to a human-readable character string that identifies the contents of the file 146 and the unique identifier may correspond to a character string that uniquely identifies the file 146 across the file system. Additionally, the data object reference may identify a data object associated with the file 146 that is stored in memory. For instance, the data object may be stored in memory 126 of the client device 106.

As used herein, the term "cloud storage device" refers to a storage device accessible by a client device 106 over the network 109. In one embodiment, a file service may be executed on the cloud storage device such that all of the files 146 stored on the cloud storage device is accessible to all users. In another embodiment, the file service may be executed such that each user may be associated with a file system. For example, each user may access only those files 146 of the file system that is associated with the respective user.

As used herein, the term "collaborative spreadsheet" refers to a spreadsheet such as, for example, Adobe® Tables, Microsoft® Excel, a Google® Docs, that is configured for simultaneous user access. As an example, the collaborative spreadsheet 153 may be a spreadsheet that includes a plurality of cells 159. For instance, the spreadsheet may have rows and columns of cells 159 each containing various data. In one embodiment, users on a variety of different client devices 106 may simultaneously access, edit, modify and/or otherwise manipulate the contents of the collaborative spreadsheet 153. For example, the collaborative spreadsheet 153 may be stored in the memory 129 of the server device 103, the memory of another device, a cloud storage device, and/or any other data store accessible via the network 109. A user on a first client device 106 and another user on a second client device 106 may simultaneously access the collaborative spreadsheet 153 and simultaneously modify different content on the collaborative spreadsheet 153. The changes made by the users may be saved in the collaborative spreadsheet 153 and presented to another user accessing the collaborative spreadsheet 153 at a later time.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, client device 106 includes a memory 126 that includes a client side application 143 and a plurality of files 146. In one embodiment, the client side application 143 may be executed to transmit a request to the modules of the server device 103 for accessing the collaborative spreadsheet 153. For example, a user on the client device 106 may request to access the collaborative spreadsheet 153 by manipulating the user interface 156 rendered on the display 113. The client side application 143 may then transmit the request to the spreadsheet module 150 and in response, receive access to the collaborative spreadsheet 153. In one embodiment, upon receiving the access, the client side application 143 may render the collaborative spreadsheet 153 on the display 113.

In one embodiment, the collaborative spreadsheet 153 may not be transmitted to the client device 106. Instead, the user may access the collaborative spreadsheet 153 as it is stored in the memory 129 of the server device 103 by interacting with the user interface 156 rendered on the display 113 of the client device 106. For instance, the collaborative spreadsheet 153 rendered on the display 113 may be a representation of the collaborative spreadsheet 153 stored in the server device 103. The user may view, add new content, edit, and/or otherwise modify the collaborative spreadsheet 153 rendered on the display 113 by manipulating the user interface 156. In response, the client side application 143 may transmit information related to the user modifications to the spreadsheet module 150. The spreadsheet module 150 may then execute the modifications indicated by the user by manipulating the collaborative spreadsheet 153 stored in the memory 129 of the server device 103. In one embodiment, the spreadsheet module 150 may then make the modified collaborative spreadsheet 153 available to the client side application 143 to be rendered on the display 113 in real time, as can be appreciated.

In another embodiment, the spreadsheet module 150 transmits a copy of the collaborative spreadsheet 153 to the client device 106 upon receiving the request. In this example, the user on the client device 106 may view, add new content, edit, and/or otherwise modify the copy of collaborative spreadsheet 153 rendered on the display 113. The copy of the collaborative spreadsheet 153 may be stored locally in the client device 106. For example, the copy of the collaborative spreadsheet 153 may be stored in the memory 126 of the client device 106. The spreadsheet module 150 may then periodically synchronize the copy of the collaborative spreadsheet 153 stored in the memory 126 of the client device 106 with the collaborative spreadsheet 153 stored in the memory 129 of the server device 103. For example, the spreadsheet module 150 may determine whether to synchronize the two collaborative spreadsheets 153 using a synchronization approach known in the art, as can be appreciated.

In one embodiment, the user may wish to associate a file 146 with a cell 159 of the collaborative spreadsheet 153. By manipulating the user interface 156, the user may transmit a request to the attachment module 149 to associate the file 146. For example, the user may indicate, via the user interface 156, a location that corresponds to the cell 159 with which to associate the file 146. In one embodiment, the user may indicate the location via a mouse, a keyboard, and/or any other input/output device 116 associated with the client device 106. Additionally, the user may specify, via the user interface 156, one or more files 146 to associate with the selected cell 159. In one embodiment, the user may select a file 146 from the memory 126 of the client device 106. For example, the file 146 may be associated with a file system stored in the memory 126 and accessible to the user. In another embodiment, the file 146 may be stored on a cloud storage device that is separate from the client device 106. For example, the file 146 stored on the cloud storage device may be part of a file system that is accessible to the user. In this example, the user may indicate a location of the file 146 stored on the cloud storage device that may then be retrieved by the attachment module 149. The client side application 143 may then transmit the request to the attachment module 149. In one embodiment, the request may include the file 146 to be attached and a unique identifier identifying the cell 159 with which to associate the file 146.

In one embodiment, the attachment module 149 receives the request over the network 109 and associates the file 146 with the specified cell 159. For example, the attachment module 149 attaches the file 146 to the specified cell 159. In one embodiment, the attachment module 149 generates a string of characters to uniquely identify the file 146. The attachment module 149 may then store the string within the specified cell 159 and mark the cell 159 as being of a "file" type. The associated file 146 may be stored in memory 129 in conjunction with the collaborative spreadsheet 153. Additionally, the associated file 146 may be stored on a storage device accessible by the server device 103 in conjunction with the collaborative spreadsheet 153. For example, the associated file 146 may be stored on a cloud storage device accessible to the attachment module 149.

The attachment module 149 may also configure the collaborative spreadsheet 153 to include a user interface component representing the associated file 146 when the collaborative spreadsheet 153 is rendered on the display 113 of the client device 106. In one embodiment, the user interface component may include an icon representing the associated file 146 and text representing a name of the associated file 146. For example, the icon may represent a type and/or category of the file 146, the identification of the user providing the file 146, and/or another aspect of the file 146. Additionally, the text may include the name of the file 146, version information, author, and/or any other identifying information about the file 146. In one embodiment, the user interface component representing the associated file 146 may adopt the formatting parameters, style parameters, alignment parameters, and/or other parameters defining the cell 159. Additionally, the user interface component maintains the association with the cell 159 if the cell 159 is subject to sorting, rearranging, re-sizing, and/or any other function. As an example, the formatting parameters defining the cell 159 may indicate that the contents of the cell 159 be center aligned. Accordingly, the icon representing the associated file 146 and the text representing the name of the associated file 146 may be center aligned within the cell 159 when the collaborative spreadsheet 153 is rendered on the display 113. On subsequent requests for access to the collaborative spreadsheet 153, the attachment module 149 may provide the modified collaborative spreadsheet 153 and the associated file 146 to the requesting users.

In another embodiment, the client side application 143 may attach the file 146 to the cell 159 of the collaborative spreadsheet 153 instead of the attachment module 149. For example, the client side application 143 may receive a request from the user to attach a file 146 to a cell 159, as described above. The client side application 143 may then transmit the file to the attachment module 149 of the server device 103. In response, the attachment module 149 may generate a unique string of characters that uniquely identifies the received file 146 and transmits the unique string to the client side application 149. The client side application 143 may then associate the file 146 to the requested cell 159, as described above. For example, the client side application 143 marks the requested cell 159 as a "file" data type and stores the unique string as the data value of the cell. On a subsequent synchronization with the server device 103, the attachment module 149 may receive an indication of a modification to the cell 159. Additionally, the attachment module 149 may also receive the file 146 referenced by the modified cell 159. In response, the attachment module 149 may bind the file 146 with the collaborative spreadsheet 153.

Upon updating the collaborative spreadsheet 153 with the modified content, the spreadsheet module 150 provides the modified collaborative spreadsheet 153 on subsequent requests for access. For example, after a first user has modified the collaborative spreadsheet 153 by attaching the file 146, a second user may request to access the modified collaborative spreadsheet 153. In one embodiment, the client side application 143 being executed on the client device 106 of the second user transmits the request to the server device 103. The spreadsheet module 150 may receive the request from the second user and provide the modified collaborative spreadsheet 153 in response to receiving the request. The client side application 143 then renders the modified collaborative spreadsheet 153 on the display 113 of the client device 106. For example, the modified collaborative spreadsheet 153 rendered on the display 113 may include the icon representing the attached file 146, as discussed above.

In one embodiment, the second user may request to download and/or open the file 146 associated with the icon by invoking the icon. In response, the client side application 143 may transmit a request to download the file 146 to the spreadsheet module 150. For example, the request to download the file 146 may include the character string that uniquely identifies the file 146 and a spreadsheet identifier that uniquely identifies the collaborative spreadsheet 153. The spreadsheet module 150 may identify the file 146 to be provided to the second user from the character string and transmits the requested file 146. For instance, the file 146 may be stored in the memory 129 of the server device 103 and/or a cloud storage device, as discussed above. The client side application 143 receives the transmitted file 146 and may render the file 146 on the display 113 of the client device 106. In one embodiment, the second user may then save the file 146 locally on the client device 106, as can be appreciated.

Figure 2:
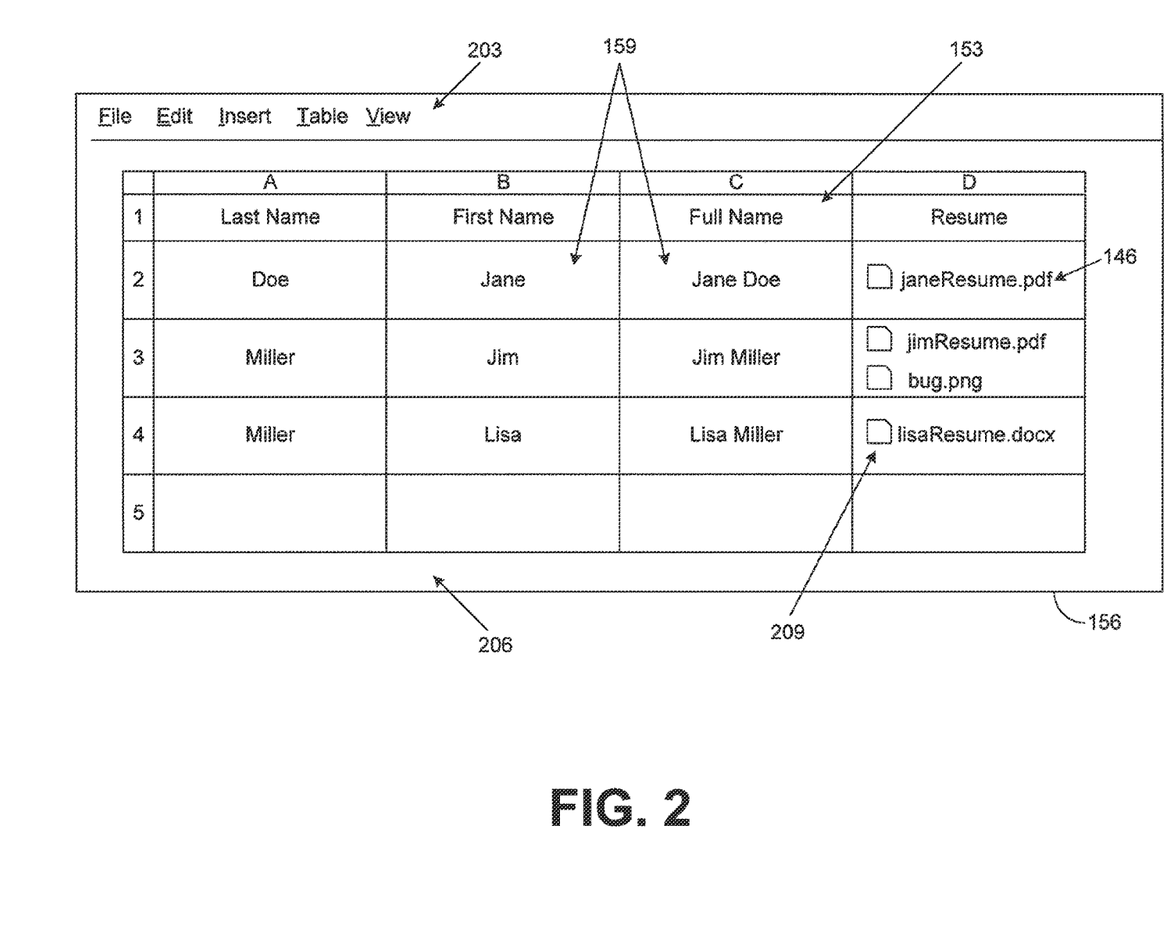
FIG. 2 illustrates exemplary user interface rendered on a display associated with a client device.

Referring next to FIG. 2, shown is one example of a user interface 156 according to certain embodiments of the present disclosure that is rendered on the display 113. In one embodiment, the user interface 156 includes a menu area 203 and a viewing area 206. The menu area 203 may include a plurality of menu options for manipulating the user interface 156. The viewing area 206 may include the collaborative spreadsheet 153 that has a plurality of cells 159. In one embodiment, the menu options of the menu area 203 may include "File," "Edit," "Insert," "Table," and "View," and/or any other menu option as can be appreciated. Invoking one of the options in the menu area 203 may transmit a request to execute a function to be performed. As an example, invoking the "Insert" option may enable the user to request to associate a file 146 with one of the cells 159 of the collaborative spreadsheet 153. In another embodiment, the user interface 156 may include a toolbar that has an attachment icon which may be invoked to enable the user to request to associate the file 146 with one of the cells 159.

Additionally, as shown, the collaborative spreadsheet 153 includes a plurality of files 146 associated with a plurality of cells 159. For example, the file 146 entitled "janeResume.pdf" is associated with the cell 159 having a cell identifier D2. Additionally, the cell 159 having the cell identifier D3 is depicted as being associated with two files 146. For example, the associated files 146 are entitled "jimResume.pdf" and "bug.png." Finally, the cell 159 having the cell identifier D4 is depicted as being associated with the file 146 entitled "lisaResume.docx." Additionally, the collaborative spreadsheet 153 includes a plurality of icons 209 representing the associated files 146 in each of the respective cells 159.

Figure 3:
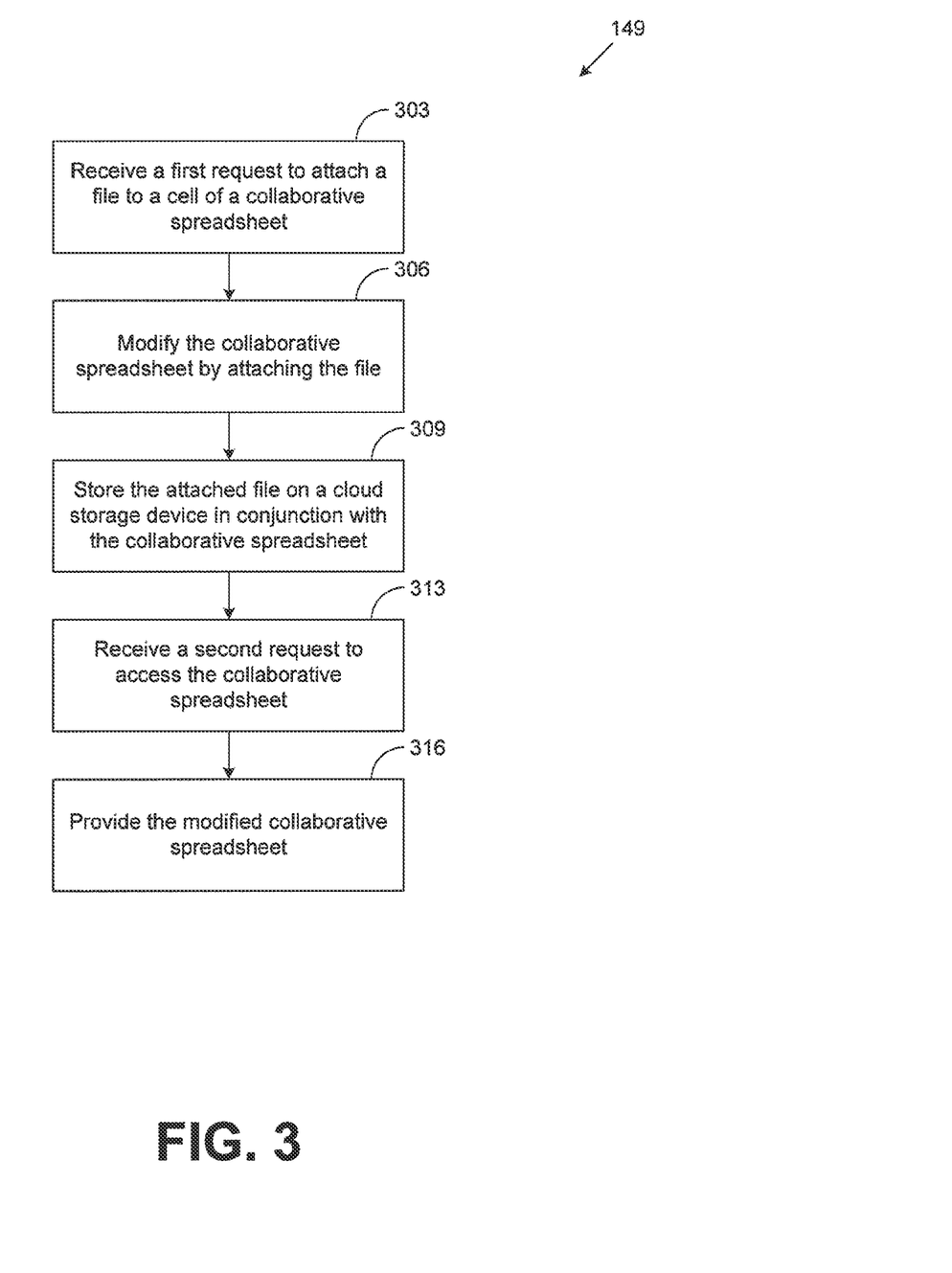
FIG. 3 is a flow chart illustrating an exemplary method of attaching a file to a cell of a collaborative spreadsheet.

FIG. 3 is a flowchart that provides one example of the operation of a portion of the attachment module 149 according to certain embodiments. It is understood that the flowchart of FIG. 3 provides merely an example of the many different types of functional arrangements that may be employed to implement the operation of the portion of the attachment module 149 as described herein. As an alternative, the flowchart of FIG. 3 may be viewed as depicting an example of steps of a method implemented in the server device 103 (FIG. 1) according to one or more embodiments.

Beginning with step 303, the attachment module 149 receives a first request to associate a file 146 (FIG. 1) with a cell 159 (FIG. 1) of the collaborative spreadsheet 153 (FIG. 1). In one embodiment, a user on the client device 106 may transmit the request by manipulating a user interface 156 (FIG. 1) rendered on the display 113 (FIG. 1). The request may include an indication of the cell 159 with which the file 146 should be associated and the file 146. In another embodiment, the attachment module 149 may transmit a request to the client device 106 to provide the file 146 upon receiving the request.

Next, in step 306, the attachment module 149 modifies the collaborative spreadsheet 153 by associating the file 146 with the specified cell 159. In one embodiment, the attachment module 149 attaches the file 146 to the cell 159 as discussed above. Additionally, the attachment module 149 may modify the collaborative spreadsheet 153 to include an icon representing the file 146 when the collaborative spreadsheet 153 is rendered on the display 113. Then, in step 309, the attachment module 149 stores the file 146 in a storage device accessible to the attachment module 149, such as, for instance, a cloud storage device. In one embodiment, the attachment module 149 stores the file 146 on the storage device in conjunction with the modified collaborative spreadsheet 153.

In step 313, the attachment module 149 receives a second request by a user on the client device 106 to access the collaborative spreadsheet 153. Responsive to the second request, in step 316, the attachment module 149 provides the modified collaborative spreadsheet 153 to the user. In one embodiment, the attachment module 149 additionally provides the file 146 to the user in conjunction with the modified spreadsheet 153.

Figure 4:
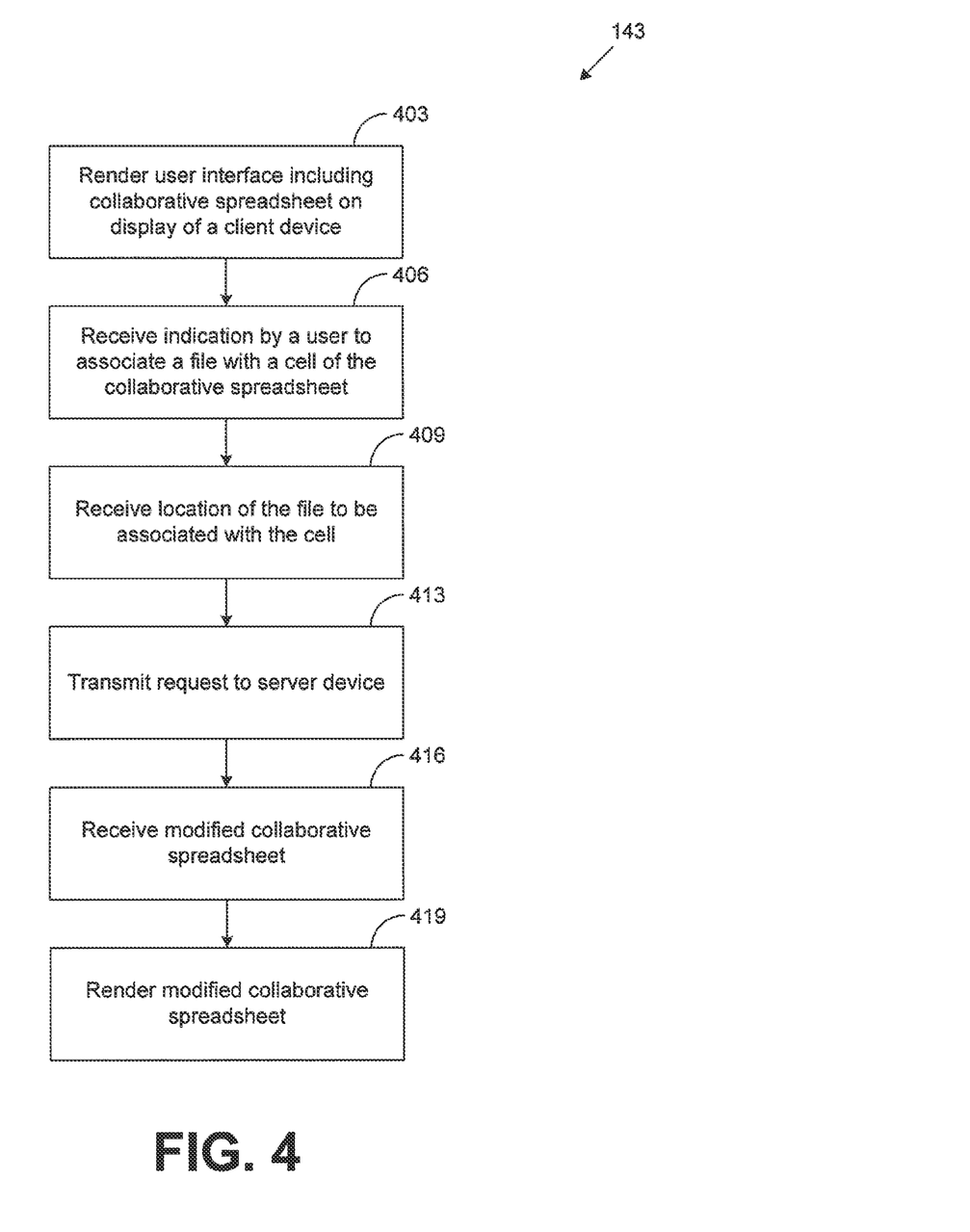
FIG. 4 is a flow chart illustrating an exemplary method of transmitting a request for attaching a file to a cell of a collaborative spreadsheet.

FIG. 4 is a flowchart that provides one example of the operation of a portion of the client side application 143 according to certain embodiments. It is understood that the flowchart of FIG. 4 provides merely an example of the many different types of functional arrangements that may be employed to implement the operation of the portion of the attachment module 149 as described herein. As an alternative, the flowchart of FIG. 4 may be viewed as depicting an example of steps of a method implemented in the client device 106 (FIG. 1) according to one or more embodiments.

Beginning with step 403, the client side application 143 renders a user interface 156 (FIG. 1) provided by the attachment module 149 (FIG. 1) on a display 113 (FIG. 1) of the client device 106. In one embodiment, the user interface 156 may include a collaborative spreadsheet 153 hosted by the server device 103. Then, in step 406, the client side application 143 receives an indication by a user of the client device 106 to associate a file 146 with a specific cell 159 of the collaborative spreadsheet 153. For instance, the client side application 143 may receive an input based on the user interface 156 being manipulated by the user.

In step 409, the client side application 143 additionally receives a location of the file 146 that is to be associated with the cell 159. In one embodiment, the client side application 143 receives the location of the file 146 from the user who may manipulate the user interface 156 to indicate the location of the file 146. For instance, the file 146 may be stored in a local memory 126 associated with the client device 106 and/or another storage device accessible to the client device 106. In one embodiment, the file 146 may be stored on a cloud storage device associated with the user of the client device 106.

Next, in step 413, the client side application 143 transmits, to the attachment module 149, a request to associate the file 146 to the specified cell 159. In one embodiment, the request may include a unique cell identifier that identifies the cell 159 and the file 146 to be associated with the cell 159. For instance, the cell identifier may contain a row identifier and a column identifier that identify the location of the specified cell 159. In another embodiment, the request may include a pointer to the location of the file 146. For instance, the file 146 may be located on a cloud storage device associated with the user that may be accessible to the attachment module 149.

In step 416, the client side application 143 receives a modified collaborative spreadsheet 153 that includes the file 146 associated with the cell 159. In one embodiment, client side application 143 may also receive the file 146 as being attached to the cell 159, as described above. Additionally, the modified collaborative spreadsheet 153 may be configured to include an icon representing the attached file 146 that appears in the cell 159 when the modified collaborative spreadsheet 153 is rendered. For instance, the icon may represent a file type of the attached file 146, identify the user attaching the file 146, and/or indicate other information related to the file 146. Then, in step 419, the client side application renders the modified collaborative spreadsheet 153 on the display 113 as part of the user interface 156.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
receiving, from a client device, by an attachment module hosted on a cloud storage device, a first request to attach a file to a cell of a collaborative spreadsheet, wherein the collaborative spreadsheet is stored on the cloud storage device, wherein the first request identifies the cell and is received in response to a user interaction at the client device with an attachment icon of the collaborative spreadsheet in a graphical user interface, wherein the graphical user interface presents the collaborative spreadsheet in a viewing area and the attachment icon in a toolbar;
sending, by the attachment module in response to the first request, a second request to the client device to provide the file; and
after receiving the file from the client device in response to the second request, attaching, by the attachment module, the file to the cell of the collaborative spreadsheet based on the first request, the attaching comprising:
in response to receiving the file from the client device, generating a unique identifier of the file and storing the file on the cloud storage device,
in response to the unique identifier being generated, inserting the unique identifier of the file in the cell identified in the first request and marking a type of the cell as being an attached file,
including in an attribute of the cell and based on the file being stored on the cloud storage device, a reference associated with a storage location of the file on the cloud storage device, the reference being different from the unique identifier and allowing access to the file from the cell of the collaborative spreadsheet, and
representing attachment of the file to the cell with a graphical component, wherein, when the collaborative spreadsheet is presented in the graphical user interface, the graphical component is presented in the cell of the collaborative spreadsheet based on the unique identifier of the file;
wherein the file is stored separately from the collaborative spreadsheet and is accessible from the cell of the collaborative spreadsheet based on the reference in the attribute of the cell to the storage location of the file.

2. The method of claim 1, wherein the unique identifier of the file comprises a character string that uniquely identifies the file.

3. The method of claim 1, further comprising:
receiving a third request to access the collaborative spreadsheet from the client device;
in response to receiving the third request, providing the collaborative spreadsheet to the client device, wherein the collaborative spreadsheets includes the attachment of the file to the cell; and
in response to receiving an indication of a selection of the graphical component rendered in the cell from the client device, providing the file from the cloud storage device to the client device.

4. The method of claim 3, wherein the graphical component includes an icon representing the file, and wherein the collaborative spreadsheet provided to the client device includes the icon inserted in the cell.

5. The method of claim 1, wherein the attached file is stored in conjunction with the collaborative spreadsheet.

6. A system comprising:
a processor for executing instructions stored in computer-readable medium on one or more devices providing an attachment module for specifying modifications to electronic content,
the attachment module comprising one or more modules configured to perform the steps comprising:
receiving, from a client device, a request to associate a file with a cell of a collaborative spreadsheet stored on a cloud storage device, wherein the request identifies the cell and is received in response to a user interaction from the client device with an attachment icon of the collaborative spreadsheet in a graphical user interface, wherein the graphical user interface presents the collaborative spreadsheet in a viewing area and the attachment icon in a toolbar;
requesting, in response to the request, the client device to provide the file; and
after receiving the file from the client device, associating the file with the cell of the collaborative spreadsheet, wherein associating the file comprises:
in response to receiving the file from the client device, generating a unique identifier of the file and storing the file on the cloud storage device,
in response to the unique identifier being generated, inserting the unique identifier of the file in the cell,
including in an attribute of the cell a reference associated with a storage location of the file, the reference being different from the unique identifier and allowing access to the file from the cell of the collaborative spreadsheet,
marking a type of the cell as being an attached file, and
representing an association of the file to the cell with a user interface component, wherein, when the collaborative spreadsheet is presented in the graphical user interface, the user interface component is presented in the cell of the collaborative spreadsheet based on the unique identifier of the file;
wherein the file is stored separately from the collaborative spreadsheet and is accessible from the cell of collaborative spreadsheet based on the reference to the storage location of the file;
receiving an access request to access the collaborative spreadsheet from a second client device; and
providing the collaborative spreadsheet to the second client device, wherein the user interface component, upon rendering at the second client device, comprises an icon that represents the file and text that represents a name of the file, wherein a selection of the user interface component provides access to the file.

7. The system of claim 6, wherein the access request comprises a pointer to the file and a cell identifier corresponding to a location of the cell.

8. The system of claim 6, wherein the attachment file comprises at least one of a document and an executable file.

9. The system of claim 6, wherein associating the file with the cell comprises:
attaching the file to the cell; and
formatting the icon and the text of the user interface component based on formatting parameters defining the cell, wherein the formatting parameters comprise at least one of: a plurality of font parameters, a plurality of style parameters, and a plurality of alignment parameters.

10. The method of claim 1, wherein the unique identifier of the file is generated by the attachment module after the file is received from the client device, based on the file, and without input from the client device about the unique identifier.

11. The method of claim 1, wherein receiving the file from the client device comprises receiving content of the file independently of the reference associated with the storage location of the file.

12. The method of claim 1, wherein the graphical component comprises an identification of a user of the client device, and wherein, when the collaborative spreadsheet is rendered at the user interface, the identification of the user is rendered within the graphical component.

13. The method of claim 1, wherein the graphical component comprises a type of the file and a name of the file, and wherein representing the file with the graphical component comprises adopting a formatting parameter of the cell, a style parameter of the cell, and an alignment parameter of the cell.

14. The method of claim 1, further comprising: providing a toolbar that comprises the attachment icon, wherein the attachment icon is configured to, when invoked, enable the request to attach the file to the cell, and wherein the request to attach the file is received from the client device in response to the attachment icon being invoked at the client device.

15. A method comprising:
receiving, by an attachment module hosted on a server, a request associated with attaching a file to a cell of a collaborative spreadsheet, wherein the collaborative spreadsheet is stored on the server, wherein the request is received from a client device, and wherein a copy of the collaborative spreadsheet is stored on the client device;
requesting, by the attachment module in response to the request, the client device to provide the file;
after receiving the file and the request from the client device:
generating, by the attachment module, a unique identifier of the file in response to the file being received from the client device, and
providing, by the attachment module, the unique identifier to the client device, the providing causing the client device to:
insert, by an application of the client device, the unique identifier of the file in a respective cell of the copy of the collaborative spreadsheet,
include, by the application in an attribute of the respective cell, a reference associated with a storage location of the file, the reference being different from the unique identifier and allowing access to the file from the respective cell of the collaborative spreadsheet,
mark, by the application, a type of the respective cell as being an attached file; and
represent, by the application, attachment of the file to the respective cell with a graphical component, wherein, when the collaborative spreadsheet is presented in the graphical user interface of the client device, the graphical component is presented in the respective cell of the collaborative spreadsheet based on the unique identifier of the file; and
based on a synchronization of the copy of the collaborative spreadsheet stored on the client device and the collaborative spreadsheet stored on the server:

receiving, by the attachment module, an indication of a modification to the cell of the collaborative spreadsheet stored on the server; and binding, by the attachment module, the file to the collaborative spreadsheet stored on the server.

16. The method of claim 15, wherein the graphical component is configured to represent the attachment by adopting a plurality of formatting parameters that define the cell, wherein the formatting parameters comprise at least one of a plurality of font parameters, a plurality of style parameters, and a plurality of alignment parameters.

17. The method of claim 1, further comprising:
receiving, from the client device in response to the second request, the file and a second file of a different type than the file, wherein the file is a document and the second file is an executable file; and
attaching, by the attachment module, the second file to the cell of the collaborative spreadsheet, wherein:
a second graphical component represents attachment of the second file to the cell, and
when the collaborative spreadsheet is presented in the graphical user interface, the graphical component representing the attachment of the file and the second graphical component representing the attachment of the second file are presented simultaneously in the cell of the collaborative spreadsheet.

18. The method of claim 1, further comprising:
in response to receiving a further request to attach a second file to the cell, attaching, by the attachment module, the second file to the cell of the collaborative spreadsheet, wherein:
a second graphical component represents attachment of the second file to the cell, and
when the collaborative spreadsheet is presented in the graphical user interface, the graphical component representing the attachment of the file and the second graphical component representing the attachment of the second file are presented simultaneously in the cell of the collaborative spreadsheet and each graphical component shows a type of the corresponding file.

19. The system of claim 6, wherein the steps further comprise:
receiving, from the client device, a second file of a different type than the file, wherein the file is a document and the second file is an executable file; and
attaching, by the attachment module, the second file to the cell of the collaborative spreadsheet, wherein:
a second user interface component represents attachment of the second file to the cell, and
when the collaborative spreadsheet is presented in the graphical user interface, the user interface component representing the attachment of the file and the second user interface component representing the attachment of the second file are presented simultaneously in the cell of the collaborative spreadsheet.

20. The method of claim 15, further comprising:
in response to receiving a further request to attach a second file to the cell, attaching, by the attachment module, the second file to the cell of the collaborative spreadsheet, wherein:
a second graphical component represents attachment of the second file to the cell, and
when the collaborative spreadsheet is presented in the graphical user interface, the graphical component representing the attachment of the file and the second graphical component representing the attachment of the second file are presented simultaneously in the cell of the collaborative spreadsheet and each graphical component shows a type of the corresponding file.

* * * * *